(12) United States Patent
Marine

(10) Patent No.: US 8,834,228 B2
(45) Date of Patent: *Sep. 16, 2014

(54) INSERT MOLDING METHOD

(75) Inventor: Jon C Marine, Fullerton, CA (US)

(73) Assignee: Mattel, Inc., El Segundo, CA (US)

( * ) Notice: Subject to any disclaimer, the term of this patent is extended or adjusted under 35 U.S.C. 154(b) by 2119 days.

This patent is subject to a terminal disclaimer.

(21) Appl. No.: 11/359,712

(22) Filed: Feb. 21, 2006

(65) Prior Publication Data

US 2006/0141899 A1 Jun. 29, 2006

Related U.S. Application Data

(63) Continuation of application No. 10/326,563, filed on Dec. 20, 2002, now Pat. No. 7,037,455.

(60) Provisional application No. 60/342,973, filed on Dec. 21, 2001, provisional application No. 60/346,362, filed on Jan. 4, 2002, provisional application No. 60/352,616, filed on Jan. 28, 2002.

(51) Int. Cl.
```
A63H 33/00      (2006.01)
B29C 41/20      (2006.01)
B29C 45/14      (2006.01)
A63H 9/00       (2006.01)
B29C 39/10      (2006.01)
A63H 3/36       (2006.01)
B29C 70/68      (2006.01)
B29C 41/04      (2006.01)
B29C 41/18      (2006.01)
B29L 31/52      (2006.01)
```

(52) U.S. Cl.
CPC ............... *B29C 45/14* (2013.01); *B29C 41/20* (2013.01); *A63H 9/00* (2013.01); *B29C 70/683* (2013.01); *B29C 41/04* (2013.01); *B29C 41/18* (2013.01); *B29K 2713/00* (2013.01); *B29C 45/14639* (2013.01); *B29L 2031/5218* (2013.01); *B29C 39/10* (2013.01); *B29C 2045/14114* (2013.01); *A63H 3/36* (2013.01)
USPC ............ 446/391; 446/175; 264/219; 264/242

(58) Field of Classification Search
USPC .......... 446/391–392; 264/131, 219–221, 238, 264/163, 257–258
See application file for complete search history.

(56) References Cited

U.S. PATENT DOCUMENTS 3,270,101 A 8/1966 Jardine et al.
3,390,482 A 7/1968 Holtvoigt (Continued)

FOREIGN PATENT DOCUMENTS

EP 0256818 2/1988
GB 1423154 1/1976

*Primary Examiner* — William M Brewster
*Assistant Examiner* — Alex F. R. P. Rada, II
(74) *Attorney, Agent, or Firm* — Kolisch Hartwell, PC

(57) ABSTRACT

A method of insert molding a preformed item into a molded product, the molded product being formed by injecting a moldable material into a mold, is disclosed. The method includes adhering the preformed item to a surface of the mold with an adhesive, wherein the surface to which the preformed item is adhered is free of any features provided for holding the preformed item in place on the mold surface. The method next includes injecting the moldable material into the mold such that the moldable material at least partially surrounds the preformed item, and curing the moldable material. Articles molded via the disclosed method are also described.

18 Claims, 4 Drawing Sheets

(56) References Cited

U.S. PATENT DOCUMENTS

| | | | |
|---|---|---|---|
| 3,972,975 A | 8/1976 | Noda | |
| 4,028,845 A | 6/1977 | Licitis | |
| 4,057,612 A | 11/1977 | Clark et al. | |
| 4,089,919 A * | 5/1978 | Sanson | 264/46.6 |
| 4,571,209 A | 2/1986 | Manning et al. | |
| 4,596,683 A | 6/1986 | Powell | |
| 4,642,209 A | 2/1987 | Powell | |
| 4,662,857 A | 5/1987 | Quinn et al. | |
| 4,673,374 A | 6/1987 | Kelley | |
| 4,696,653 A | 9/1987 | McKeefrey | |
| 4,890,356 A | 1/1990 | Czech et al. | |
| 5,164,144 A | 11/1992 | Rose | |
| 5,257,873 A | 11/1993 | Abbat | |
| 5,281,180 A | 1/1994 | Lam et al. | |
| 5,458,524 A | 10/1995 | Lucas | |
| 5,498,388 A | 3/1996 | Kodai et al. | |
| 5,510,074 A | 4/1996 | Rose | |
| 5,570,124 A | 10/1996 | Ohno et al. | |
| 5,645,780 A | 7/1997 | Rinehart | |
| 5,695,381 A | 12/1997 | Truchsess | |
| 5,894,006 A | 4/1999 | Herbst | |
| 5,913,708 A | 6/1999 | Gross | |
| 5,919,324 A | 7/1999 | Moffitt et al. | |
| 5,955,021 A | 9/1999 | Tiffany, III | |
| 5,989,658 A | 11/1999 | Miura et al. | |
| 6,048,209 A * | 4/2000 | Bailey | 434/267 |
| 6,050,875 A | 4/2000 | Lee | |
| 6,077,083 A | 6/2000 | Smith-Whitley et al. | |
| 6,089,950 A | 7/2000 | Lee et al. | |
| 6,331,028 B1 | 12/2001 | O'Neill et al. | |
| 6,375,778 B1 | 4/2002 | Cremades Schulz et al. | |
| 6,482,284 B1 * | 11/2002 | Reidt et al. | 156/200 |
| 6,482,287 B1 | 11/2002 | De Gaulle | |
| 6,514,117 B1 * | 2/2003 | Hampton et al. | 446/301 |
| 6,537,128 B1 * | 3/2003 | Hampton et al. | 446/301 |
| 6,544,094 B1 * | 4/2003 | Maddocks et al. | 446/175 |
| 6,544,098 B1 * | 4/2003 | Hampton et al. | 446/301 |
| 6,544,634 B1 | 4/2003 | Abrams et al. | |
| 6,672,934 B2 * | 1/2004 | Hornsby et al. | 446/300 |
| 6,776,681 B2 | 8/2004 | Willett | |
| 6,959,166 B1 * | 10/2005 | Gabai et al. | 434/308 |
| 6,991,511 B2 * | 1/2006 | Maggiore et al. | 446/330 |
| 7,037,455 B2 | 5/2006 | Marine | |
| 7,322,874 B2 * | 1/2008 | Ellman et al. | 446/345 |
| 2002/0136914 A1 * | 9/2002 | Uchida et al. | 428/515 |
| 2003/0155262 A1 | 8/2003 | Graham | |

\* cited by examiner

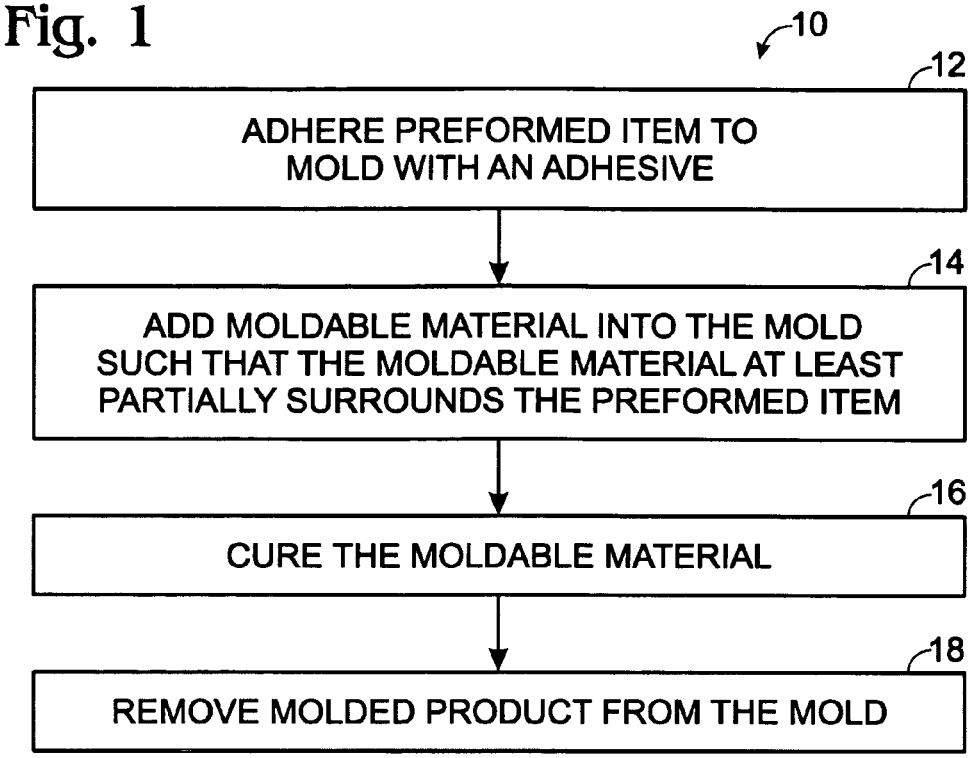
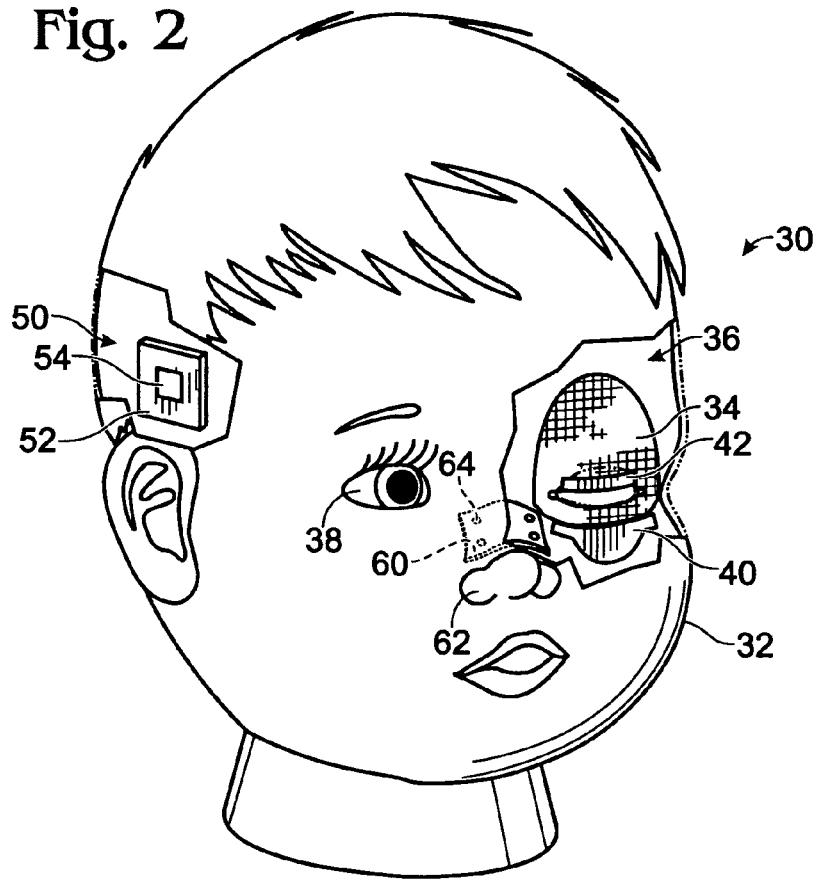

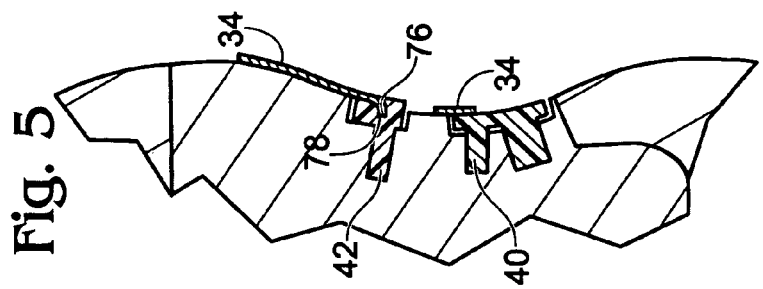
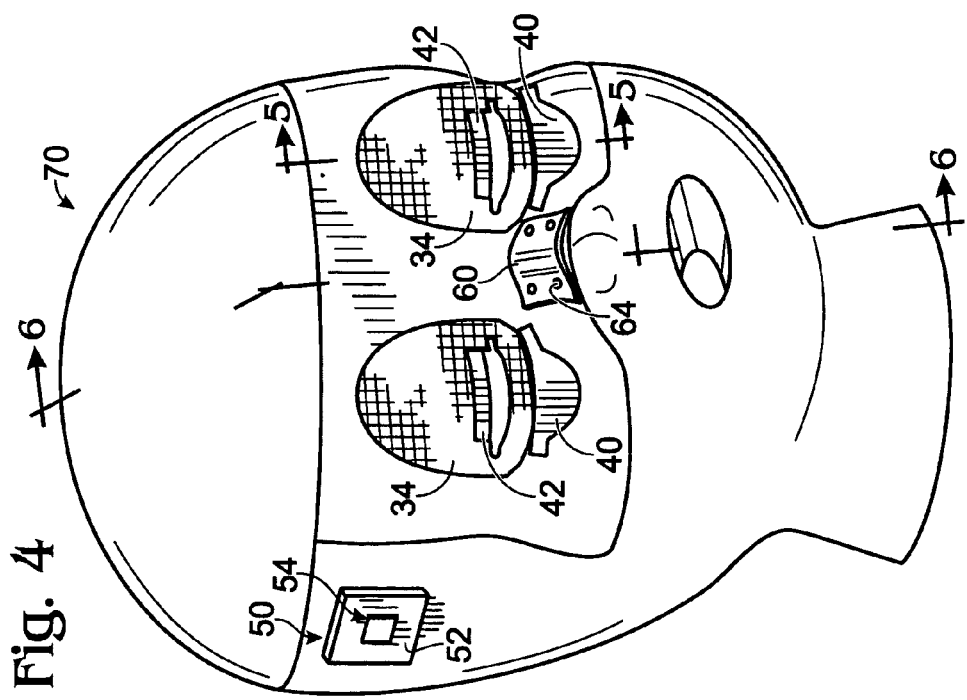
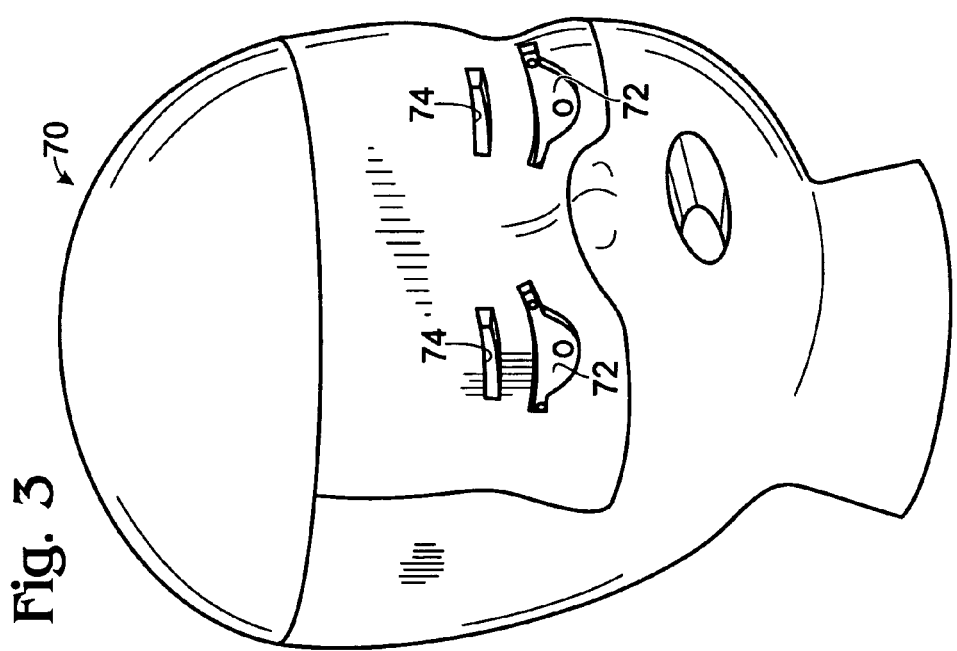

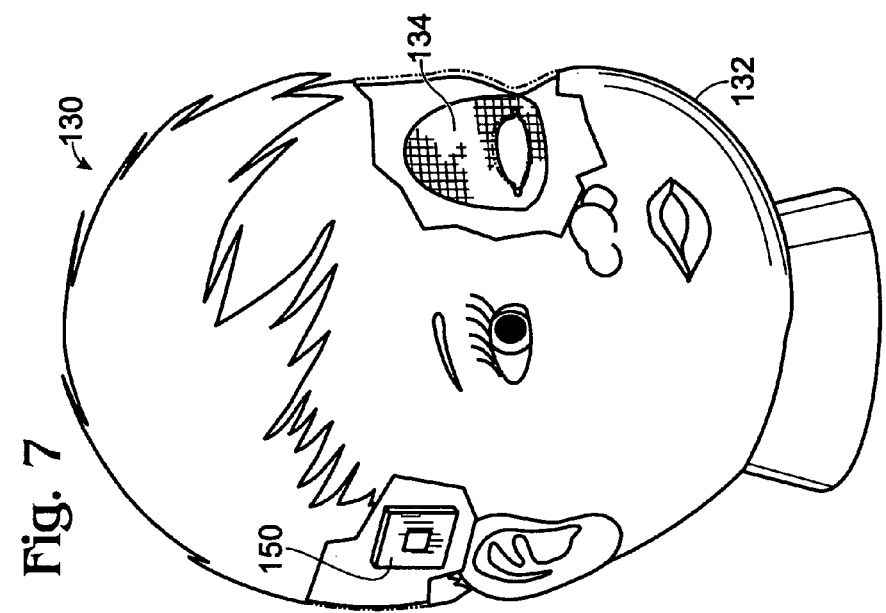
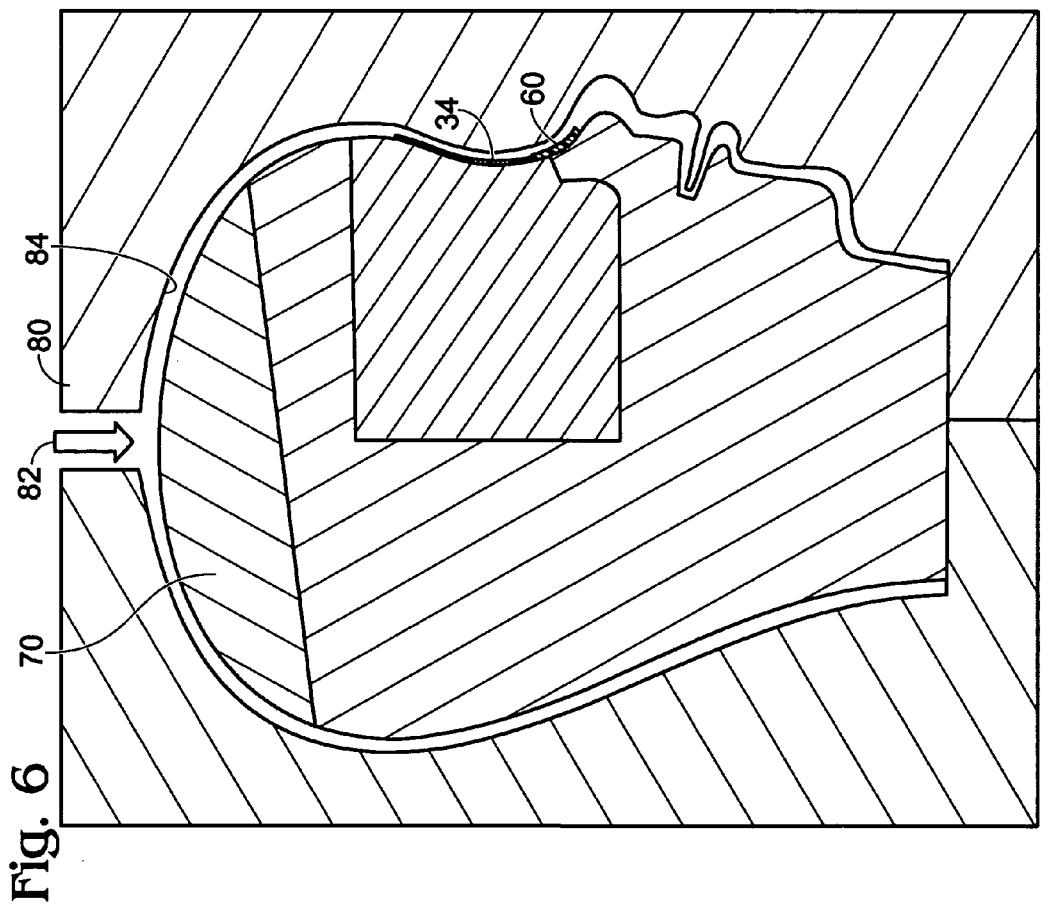

INSERT MOLDING METHOD

CROSS-REFERENCE TO RELATED APPLICATIONS

This application is a continuation of U.S. patent application Ser. No. 10/326,563. The complete disclosure of which is hereby incorporated by reference for all purposes.

TECHNICAL FIELD

The present invention relates to a method of insert molding a preformed item into a molded product.

BACKGROUND

In the formation of molded articles, it is often desired to integrate various preformed items into the molded article during the molding process. One common way of incorporating preformed items into a molded article is via insert molding. Insert molding involves first placing the preformed item into a desired location within a mold, and then adding a moldable material, such as a polymer, into the mold in such a manner that the polymer either contacts or surrounds at least part of the preformed item. As the moldable material sets, the preformed item is incorporated into the molded article.

Current insert molding techniques typically require the mold to be specially tooled to hold the preformed item in place during the molding process. Sometimes, this may involve forming mounting holes in the mold that are configured to accept complementary mounting pins on the preformed item. Such a mold may require expensive and complex tooling, which may add to the cost and complexity of the overall molding process. Furthermore, the completed molded article may have exposed tooling holes, or other visible defects, caused by the molding process. Correcting or hiding these defects may be time-consuming and expensive, and thus may increase the overall cost of the molding process. Additionally, this method may not be suitable for use with items to which the attachment of mounting pins may be difficult, such as fabric pieces or other thin, flexible items.

Exemplary molding methods and articles are disclosed in U.S. Pat. No. 3,390,482 to Holtvoight; U.S. Pat. No. 3,972,975 to Noda; U.S. Pat. No. 4,596,683 to Powell; U.S. Pat. No. 4,642,209 to Powell; U.S. Pat. No. 5,645,780 to Rinehart; U.S. Pat. No. 5,919,324 to Moffitt et al.; and U.S. Pat. No. 6,331,028 to O'Neill et al., the disclosures of which are hereby incorporated by reference. Other exemplary molded articles are disclosed in U.S. Pat. No. 4,028,845 to Licitis; U.S. Pat. No. 5,913,708 to Gross; and U.S. Pat. No. 6,050,875 to Lee, the disclosures of which also are hereby incorporated by reference.

SUMMARY

A method of insert molding a preformed item into a molded product, the molded product being formed by injecting a moldable material into a mold, is provided. The method includes adhering the preformed item to a surface of the mold with an adhesive, wherein the surface to which the preformed item is adhered is free of any features provided for holding the preformed item in place on the mold surface. The method next includes injecting the moldable material into the mold such that the moldable material at least partially surrounds the preformed item, and curing the moldable material.

BRIEF DESCRIPTION OF THE DRAWINGS

FIG. 1 is a flow diagram showing a first embodiment of a method of insert molding according to the present invention.

FIG. 2 is a partially broken-away isometric view of an embodiment of a molded product formed via the method of FIG. 1.

FIG. 3 is an isometric view of an embodiment of a mold core suitable for forming the molded product of FIG. 2, before adhering preformed items to the mold core.

FIG. 4 is an isometric view of the mold core of FIG. 3, after adhering preformed items to the mold core.

FIG. 5 is a sectional view of the mold core of FIG. 4, showing the joining of a preformed piece of fabric to another insert molded item.

FIG. 6 is a sectional view of the mold core of FIG. 4 positioned inside of a mold cavity before an injection molding process.

FIG. 7 is a partially broken-away isometric view of a second embodiment of a molded article formed via the method of FIG. 1.

DETAILED DESCRIPTION OF THE DEPICTED EMBODIMENTS

Figure 8:
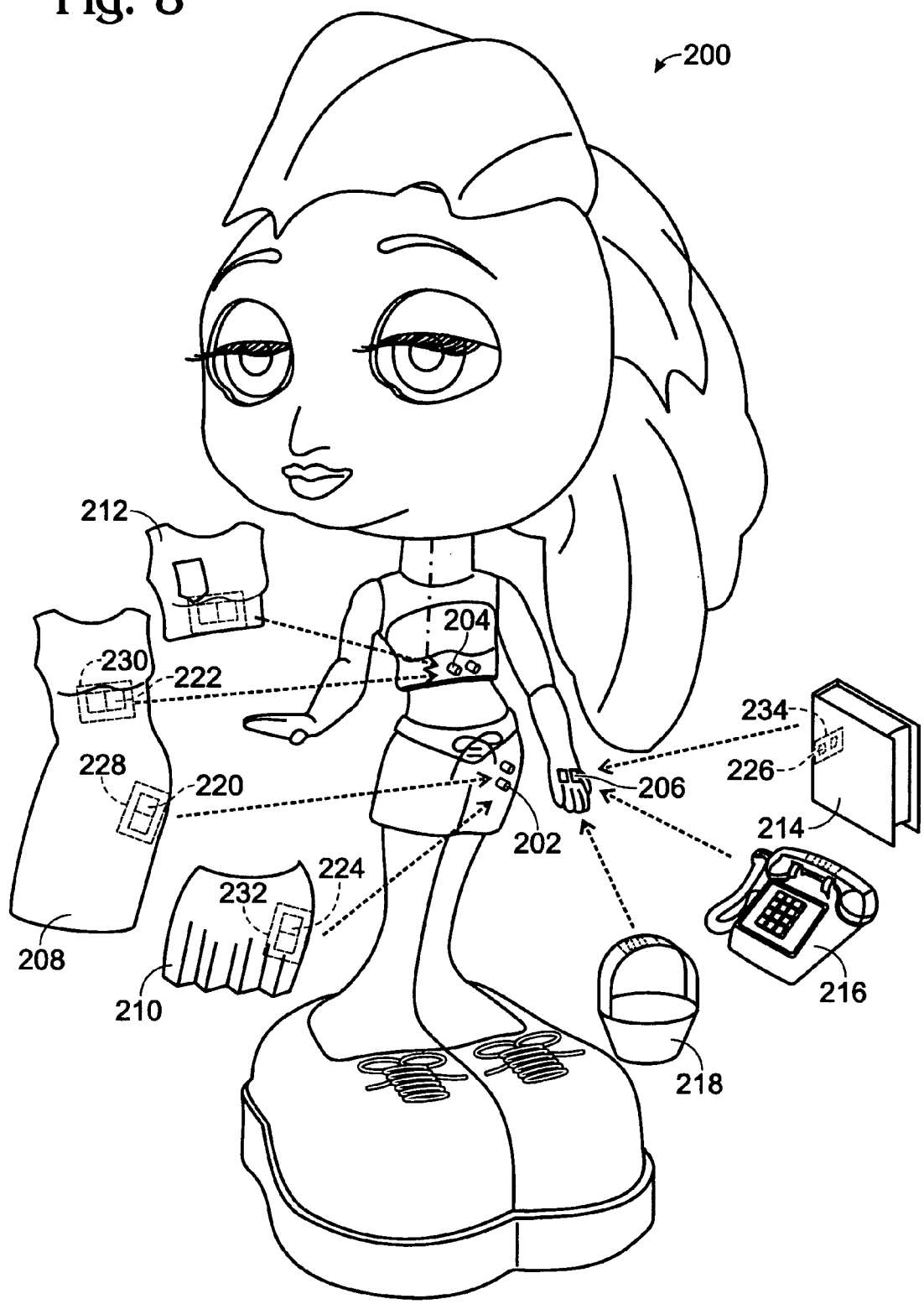
FIG. 8 is an isometric view of other embodiments of molded products formed by method 10, in the form of a doll and various doll's accessories.

FIG. 1 shows, generally at 10, a first embodiment of a method of insert molding a preformed item into a molded product. Method 10 includes first adhering the preformed item to a surface within a mold with an adhesive to secure the preformed item at a desired location within the mold. In some embodiments, the preformed item is adhered to a surface in the mold that is free from any features provided for holding the preformed item in place during a molding process. Next, method 10 includes adding a moldable material into the mold such that the moldable material at least partially surrounds the preformed item. After the moldable material is added into the mold, the moldable material is cured to form the molded product and to secure the preformed item within the molded product. After curing, the molded product is removed from the mold. Because the preformed item is insert molded into the molded product, it is removed from the mold with the molded product.

Method 10 may provide several advantages over known insert molding methods. For example, because the preformed item is held in position in the mold with an adhesive, the use of method 10 may allow the preformed item to be insert molded without using a mold having features provided for holding the preformed item in place during molding, such as depressions in the mold surface. This may help to avoid complex and expensive tooling used to hold preformed items in place in conventional insert molding processes, and thus may help reduce the cost of the mold. Also, the use of method 10 may permit a single mold to be used to selectively mold different combinations of inserts into a single type of molded product without having to use a different mold for each different combination of preformed items. Furthermore, the finished product may require less clean-up or touch-up work to remove than products molded by other insert molding processes, as it may have fewer tooling holes, mounting pins, or other artifacts from the molding process that need to be removed. These advantages may combine to decrease the costs and increase the efficiency of an insert molding process to a significant degree.

A wide variety of preformed items may be insert molded via method 10, for example, either flexible or rigid preformed items. Examples of suitable preformed items include, but are not limited to, plastic sheets, pieces of fabric, plastic parts, metal parts, printed circuit boards, and other electrical components.

Likewise, method 10 may be used to manufacture a wide variety of molded products, including but not limited to toy items such as housings, wheels, tires, decorative cases, game pieces, playsets, etc. FIG. 2 shows one example of a suitable molded product in the form of a doll's head 30 having an outer molded portion 32. FIG. 2 also shows several different exemplary preformed items insert molded into the doll's head via method 10. For example, outer molded portion 32 of doll's head 30 includes a reinforcement 34 insert molded into the outer molded portion adjacent an eye region 36 of the doll's head.

Reinforcement 34 may be insert molded into doll's head 30 where the doll's head has an interactive feature that causes deformation of outer molded portion 32 of the doll's head. In the depicted embodiment, doll's head 30 includes connectors 40 and 42 insert molded into (or otherwise attached to) the outer molded portion 32 of doll's face 30 for connecting to a motor (not shown) to actuate movement of the eye regions 36 with movements in the doll's eye 38. Reinforcement 34 is used to reinforce eye region 36 against stresses in the eye region caused by repeated movements of eye 38. While method 10 is described in the context of molding a doll's head, it will be appreciated that method 10 also may be used to form any other suitable molded product.

Reinforcement 34 may be formed from any suitable material. The choice of material may for reinforcement 34 may be influenced to some degree by the type of molding process used to form doll's head 30. For example, where an injection molding process is used to form doll's head 30, a thin, sheet-like material may be used to form reinforcement 34, as the use of such a material may lessen the height of the profile of the reinforcement in the mold, and thus may reduce the pressure exerted against the reinforcement by the injection of moldable material during an injection molding process. This may help to prevent reinforcement 34 from being peeled off of the mold surface during the injection process. Examples of suitable thin, sheet-like materials for use as reinforcement 34 include fabrics. It has been found that, when added to the mold as described in detail below, fabric reinforcements 34 reliably stay on the desired mold surface even during high pressure injection processes.

Any suitable type of fabric may be used for reinforcement 34. For example, the fabric may have any desired type or tightness of weave or knit, and may be made from either natural or synthetic fibers. Examples of suitable fabrics include, but are not limited to, single knit, interlock, percale, organza and tricot weaves. Furthermore, non-woven fabrics may also be used. Examples of suitable non-woven fabrics include, but are not limited to, fabrics made of nylon, polyester, polypropylene, and other olefins.

Interlock fabrics have been found to be particularly suitable for use as reinforcements around eye region 36. Interlock fabrics typically have a dimension along which the fabric may stretch, typically to a relatively small degree. This may be utilized to disperse stresses in outer molded portion 32 caused by repeated deformations of eye region 36, as described in more detail below.

The fabric of reinforcement 34 may be oriented in any desired direction in the molded doll's head. It has been found that orienting the fabric in a particular direction may offer advantages in some situations. Where an interlock fabric is used, orienting the direction of stretch of the fabric in the direction of the movement of the doll's eyelid may help to disperse the forces at the points where connectors 40 and 42 meet outer molded portion 32 of doll's head 30 by distributing the forces through the fabric. Furthermore, if the doll's eyelid forms a crack, the stretch of the fabric may help to prevent the crack from deepening or propagating. It has also been found that orienting the direction of fabric stretch along the direction of the movement of the doll's eye region 36 improves the shape and overall appearance of the doll's eye region.

The fabric used for reinforcement 34 may be made of any suitable type of yarn, for example, a monofilament yarn or a spun yarn. The use of a fabric made from a spun yarn may be advantageous over the use of a monofilament yarn, as the moldable material may be able to impregnate the spaces between the individual yarn fibers of a spun yarn, and thus bond more strongly to the fabric of reinforcement 34.

Furthermore, the fabric of reinforcement 34 may be made from a staple fiber if desired. A staple fiber is a yarn in which the filaments have different lengths. The filament ends protrude outwardly from the yarn along the length of the yarn, giving the yarn a "fuzzy" or "hairy" appearance. It has been found that the use of a fabric made from a staple fiber as reinforcement 34 may allow the reinforcement to be bonded especially strongly to the moldable material. The filament ends increase the surface area in contact with the moldable material, and thus may help to strengthen the overall bond between the fabric and the moldable material.

Reinforcement 34 may be made from a fabric with any suitable weight. Generally, a lighter weight fabric has a looser weave than a heavier weight fabric. The use of lighter weight fabrics for reinforcement 34 may offer some advantages over the use of heaver weight fabrics, as the moldable material may be able to reach the open spaces in the weave more easily, and thus form a tighter bond with the fabric.

Besides the properties discussed above, the fabric used for reinforcement 34 may be selected to tailor the strength, flexibility, degree of chemical and/or physical interaction between the fabric and the moldable material, and/or any other desired physical property.

Besides reinforcement 34, FIG. 2 shows other examples of preformed items that may be insert molded into doll's head 30 via method 10. For example, doll's head 30 may include an insert molded electronic element, indicated schematically at 50. Electronic element 50 may take the form of any suitable single component or group of components. For example, electronic element 50 may take the form of an electrical contact, a low profile battery or battery holder, a switch, an integrated circuit, or a printed circuit board containing any number of individual components.

Electronic element 50 may take the form of a printed circuit board 52 that includes a controller 54 configured to control movement of the doll's eyes, or other interactive features. The printed circuit board may also include individual components, such as resistors, capacitors, etc., (not shown) in electrical communication with controller 54. Where such components are present on printed circuit board 50, they may take the form of either through hole components or surface mount components. The use of surface mount components may be advantageous in some circumstances. For example, where the molded article is formed via an injection molding process, it has been found that the smaller profile of surface mount components helps to reduce the pressure exerted by the moldable material against the components during the injection of the moldable material, and thus helps to prevent electronic element 50 from being peeled off the mold surface during an injection process.

Electronic element 50 may be molded into doll's head 30 at any suitable location. The location at which electronic element 50 is molded into doll's head 30 may be selected based upon various criteria, including the size and shape of the electronic element. For example, where electronic element 50 includes a printed circuit board 52 having a generally flat shape, as with the embodiment of FIG. 2, the electronic element may be positioned in a location on the molded article without significant degrees of surface curvature or contours to prevent causing deformation of the head. In the embodiment of FIG. 2, electronic element 50 is positioned just above an ear 56 of doll's head 30. This portion of doll's head 30 has fewer contours than the face region of the doll's head, and thus may be more suitable for a relatively large electronic element. Likewise, where the electronic element has a smaller size and/or suitable shape, it may be molded into the face portion of doll's head 30. While electronic element 50 is positioned just above ear 56 in the depicted embodiment, it will be appreciated that the electronic element may be positioned in any other suitable location, including, but not limited to, the regions located adjacent the back of doll's head 30, the top of the head, the neck and the forehead.

Yet another example of a preformed item that may be insert molded into doll's head 30 via method 10 is a generally rigid part configured to support the shape or contour of a selected part of doll's head 30. An example of such a support piece is shown in FIG. 2 at 60 as a piece configured to support a shape or contour of a nose 62 of doll's head 30. The use of support piece 60 may be advantageous where doll's head is formed from an elastomer or other flexible material. Furthermore, support piece 60 may be coupled to a motor (not shown) to allow the doll's nose to be crinkled or otherwise moved as a part of an interactive feature. Support piece 60 may include one or more holes 64 through which moldable material may flow to help bond the support piece to outer molded portion 32. Besides reinforcement 34, electronic element 50 and support piece 60, many other types of items may be insert molded into a molded product via method 10. Examples include, but are not limited to, decorative items, lenses or optical items, and structural items, which each may be made from plastics or other materials. Thus, while the individual steps of method 10 are described in more detail below in the context of reinforcement 34, electronic element 50 and support piece 60, it will be appreciated that they are exemplary only, and not limiting to the applicability of method 10.

As described above, method 10 first involves adhering a preformed item to the mold. A core of a mold suitable for forming doll's head 30 is shown generally at 70 in FIGS. 3-4. Mold core 70 may include various features that allow it to hold some items for insert molding. For example, mold core 70 includes recesses 72 and 74 for holding connectors 42 and 42, respectively, during the molding process. However, mold core 70 does not include recesses corresponding to reinforcement 34, electronic element 50 or support piece 60. Instead, these items are adhered with an adhesive directly to surfaces on mold core 70 that are otherwise free of features provided to hold these items in place during a molding process.

FIG. 4 shows the application of reinforcement 34, electronic element 50 and support piece 60 to mold core 70. As described above, each of these items is applied to mold core 70 with an adhesive to hold the item in place during the addition and curing of the moldable material. Any suitable adhesive may be used to hold these items to the mold surface. Suitable adhesives include those that release from the surface of mold core 70 relatively easily upon the completion of method 10 to reduce the likelihood of any of reinforcement 34, electronic element 50 and support piece 60 being pulled out of molded outer portion 32 by the adhesive when the molded outer portion is removed from mold core 70. While the embodiment of FIGS. 3-4 shows the preformed items adhered to a mold core, it will be appreciated that the preformed items may also be adhered to a mold cavity, or any other suitable surface within or on a mold. Where a selected preformed item is applied to a generally flat mold surface, the adhesive is typically applied only to a single surface of the preformed item. However, it will be appreciated that the adhesive may be applied to as many surfaces as desired, depending upon the geometries of the preformed item and the mold surface.

The adhesive may either be applied to the surface of mold core 70 before adding reinforcement 34, electronic element 50 and/or support piece 60 ("the preformed items"), or may be added to a surface of each of these items before applying the items to the mold core surface. Adding the adhesive to the preformed items instead of to the surface of mold core 70 may help to prevent excess adhesive from extending beyond the edges of the preformed items on the mold core surfaces.

The adhesive may be applied to the preformed items in a layer of any desired thickness. The use of a relatively thin layer of adhesive may help to decrease the height of the profile of preformed items in the mold, and thus may help to lessen the pressure exerted against the preformed item when the moldable material is added into the mold, especially in injection molding processes.

The thickness of the adhesive layer added to the back of the preformed items (or any of the individual items) may be dependent to some degree upon the type of adhesive used. For example, if an acrylic adhesive is used, a thickness of approximately 0.005 inches may be suitable. A layer of adhesive of this thickness may be sufficiently thin not to affect the profile height of the preformed item in the mold significantly. As another example, the use of a block copolymer adhesive sold under the trade name KRATON by Shell Oil Co., may allow a thinner adhesive layer, on the order of approximately 0.002 inches thick, to be used.

The adhesive used to adhere the preformed items to mold core 70 may have any suitable thermal stability and release properties. For example, it may be desirable to use an adhesive that decomposes or otherwise loses its effectiveness with the application of heat and/or pressure. Such an adhesive may reduce the amount of residue left behind on the mold surface or on the molded article after completion of the molding process, and thus may reduce the amount of clean-up time needed between moldings. Many common adhesives may degrade due to the heat generated or dissipated in common molding processes. Alternatively, it may be desirable to use an adhesive that releases completely from the mold surface after the molded article is removed from the mold, again to reduce the amount of residue left on the mold after the molded article is removed from the mold.

Furthermore, a pressure-sensitive adhesive may be used to adhere the preformed items to mold core 70. A pressure-sensitive adhesive is an adhesive with a bonding strength proportional to the pressure used to press the adhering surfaces together. The use of a pressure-sensitive adhesive may be advantageous, as initially applying the surfaces together with only light pressure may allow the position of a selected preformed item on the mold surface to be changed. Once the selected preformed item is in the desired location on the mold surface, the selected preformed item and the mold surface may be pressed together more firmly to strengthen the bond of the selected preformed item to the mold surface.

The adhesive may be applied to preformed item 10 in any suitable manner. For example, the adhesive may be applied by spraying, or by a release transfer process. Where the preformed item made of fabric (or other thin, sheet-like material), such as reinforcement 34, a particularly efficient method of applying the adhesive layer is to apply a release-coated layer of adhesive to the back of a piece of raw fabric (along with a sheet of release paper, if desired), and then to stamp, cut or otherwise define the shape of the fabric piece that is to be insert molded into doll's head 30. This technique may allow multiple fabric items to be formed from a single adhesive-coated piece of raw fabric.

If desired, reinforcements 34 may each include an additional tongue of material that fits within a slot in, or against a complementary surface or other feature on, connector 42 to bond the connector and the reinforcement together during the molding process. FIG. 5 shows an example of a suitable tongue-and-slot connection between connector 42 and reinforcement 34. Connector 42 includes a slot 74 into which a tongue 76 formed in reinforcement 34 may be extended while the connector and reinforcement are in position on the mold. After inserting tongue 76 into slot 74, moldable material may be added to the mold to fix the tongue in the slot, and thus to bond the connector to the reinforcement. This may help to distribute stresses in outer molded portion 32 of doll's head 30 caused by the movement of eye region 36 to the fabric more efficiently, and thus may help to prevent the plastic part from being pulled out of the elastomeric material forming the doll's head during use.

After the preformed items are adhered to the mold, the molding process may be begun. Referring to FIG. 6, this may include adding an exterior portion of the mold, indicated generally at 80, around mold core 70, and then injecting a moldable material into the mold, as indicated by arrow 82, to fill the space between mold core 70 and mold cavity wall 84 with moldable material. It has been determined that the adhesives and methods of mounting the preformed materials disclosed herein bond the preformed materials sufficiently strongly to allow the use of high-pressure injection processes without peeling the preformed materials from, or significantly shifting them on, the surface of mold core 70. Thus, where an injection molding process is used, the moldable material may be injected at essentially any suitable location within mold 80.

Mold 80 may be filled with any suitable moldable material. Examples include, but are not limited to, elastomeric materials, as well as more rigid materials such as ABS plastic. After injecting the moldable material into the mold, the moldable material is cured or otherwise hardened to form outer molded portion 32, typically by cooling the mold. Examples of suitable moldable materials for use in such an injection molding process include, but are not limited to, SEBS kraton blends, SBS kraton blends, high-impact styrene, ABS, acrylics, Polycarbonates, PVC, and commodity grade and engineering grade resins.

Once the molding process is complete, outer molded portion 32 of doll's head 30 may be removed from mold 80. Outer molded portion 32 may be removed from mold 80 in any suitable manner. In general, the same methods may be used to remove outer molded portion 32 from mold 80 that are used in the absence of an adhesive, as the adhesive typically releases from the mold surface when the molded article is removed from the mold. Upon completion of the molding process, reinforcements 34, electronic element 50 and support piece 60 are each incorporated within outer molded portion 32 at a location within the interior of the outer molded portion. Because mold 80 uses no mounting holes for holding each of these items, outer molded portion 32 may have fewer exposed tooling holes or other imperfections than if it were formed via conventional insert molding techniques. This may significantly increase the efficiency, and decrease the costs, of the overall molding process, as it may allow clean-up steps downstream of the molding steps to be eliminated to a great degree.

If an adhesive that does not break down during the molding process is used to adhere the preformed items to the surfaces of mold 80, some residual adhesive may remain on the surface of outer molded portion 32 after it is removed from mold. If desired, the residual adhesive may be covered, chemically broken down, or otherwise deactivated so that the surface of the molded article does not feel sticky. The residual adhesive may be deactivated in any suitable fashion, for example, by cleaning with a solvent, or via the application of a coating of an inert substance. Suitable inert substances include those that are non-toxic and that do not react with the molded article. Talcum powder has been found to be a particularly good inert substance, due to its low cost, non-toxicity and ability to cover essentially completely any exposed adhesive.

After removing outer molded portion 32 from mold 80, various other features may be added to outer molded portion 32 to form complete doll's head 30 and give it a more life-like appearance. For example, hair, eyelashes, paint, etc. may be added to outer molded portion 32. Furthermore, a pigment, dye or other colorant may be added to the moldable material before adding the moldable material to the mold to give doll's head 30 a flesh-colored tone. The colorant may be added in a sufficient quantity to render doll's head 30 opaque, or may be added in a lesser quantity if desired. It may be desirable to use sufficient colorant to render the doll's head opaque to hide reinforcements 34, electronic element 50, support piece 60, and other items contained within the head from view.

As described above, method 10 allows a single mold to be used to selectively mold a variety of different preformed items into molded products formed with a single mold. FIG. 7 shows generally at 130 an example of the doll's head of FIG. 2 formed without support piece 60. Doll's head 130 includes an exterior molded portion 132, an insert molded reinforcement 134 disposed adjacent an eye region of the doll's head, and an insert molded electronic element 150, as described above for the embodiment of FIG. 2, but does not have a support piece corresponding to support piece 60 of the embodiment of FIG. 2. Doll's head 130 may be molded in the same mold 80 as used to form the embodiment of FIG. 2 simply by adhering reinforcement 134 and electronic element 150 to mold core 70, and then following an ordinary molding process. Likewise, any other combination of preformed items besides those shown in the embodiments of FIGS. 2 and 7 may be molded into molded outer portion 132 simply by adhering the desired combination of preformed elements to the surface of mold core 70 before adding the moldable material to the mold.

As described above, method 10 may be used to mold many different types of preformed items into many different types of molded products. Some other examples of molded products with preformed items insert-molded into the items via method 10 are shown in FIG. 7, which depicts a doll 200 having a plurality of pairs of electrical contacts disposed at various points on its body. In particular, doll 200 includes electrical contacts 202 adjacent a hip region of the doll, contacts 204 adjacent a chest region of the doll, and contacts 206 adjacent a hand region of the doll.

FIG. 7 also shows a plurality of accessories adapted to be coupled to doll 200. For example, the accessories include a dress 208, a skirt 210 and a shirt 212 adapted to be coupled to the body portion of the doll. The accessories also include a book 214, a telephone 216 and a basket 218 adapted to be coupled to the hand portion of the doll.

Each of the accessories includes at least one pair of electrical contacts configured to connect to a corresponding pair of contacts on doll 200. For example, dress 208 includes contacts 220 configured to connect to contacts 202 on doll 200, and contacts 222 configured to connect to contacts 204 on the doll. Likewise, skirt 210 includes contacts 224 configured to connect to contacts 202 on the doll, and book 214 includes contacts 226 configured to connect to contacts 206 on the doll's hand.

The contacts on each of the accessories are electrically connected to an underlying circuit board. For example, contacts 220 on dress 208 are electrically connected to circuit board 228, contacts 222 on the dress are connected to circuit board 230, contacts 224 on skirt 210 are connected to circuit board 232, and contacts 226 on book 214 are connected to circuit board 234. Each circuit board includes electrical components (not shown) particular to that circuit board so that a processor within doll 200 may identify which accessories are attached and trigger a response from the doll particular to that accessory. For example, the doll may include memory having a plurality of pre-recorded messages, wherein attachment of a selected accessory causes a selected message to be played. The structure and functions of a doll similar to doll 200 are disclosed more fully in U.S. patent application Ser. No. 09/851,539 of Bill Willett for an ANIMATED DOLL, the disclosure of which is hereby incorporated by reference.

Each circuit board 228, 230, etc. may include any suitable circuit elements that are capable of distinguishing one accessory from another. For example, each circuit board may include one or more resistors (not shown) that cause a particular current to flow through the contacts associated with that circuit board. This current may then be detectable by circuitry within doll 200 to trigger the appropriate response from doll 200.

The circuit boards and electrical contacts (which may be integrated into the circuit boards) may be molded into the accessories via method 10. According to method 10, the circuit board and/or electrical contacts for each accessory is adhered to the surface of a mold used to mold the accessory before a moldable material is added to the mold. Next, the moldable material is added to the mold, and then cured to incorporate the circuit board and electrical contacts into the accessory.

Molding the circuit boards and electrical contacts into the accessories via method 10 may offer advantages over adding the circuit boards and contacts to the accessories after molding the accessories. For example, if the circuit boards and contacts are added after molding the accessories, some sort of compartment or cover may need to be added to the accessories to hold and protect the circuit boards and contacts. Room for such a compartment or cover therefore must be provided on each accessory, which may increase the bulkiness of the accessories. On the other hand, manufacturing the accessories according to method 10 allows the circuit boards and/or electrical contacts to be incorporated into the accessory, thus simplifying the accessory manufacturing process and reducing the bulkiness of the accessories.

While described above primarily in the context of injection molding, an insert molding process according to the present invention may also be employed in the context of other molding techniques. One example of another suitable technique is roto-casting. Roto-casting processes typically involve the use of a closed mold into which pellets of a selected polymer (for example, a vinyl polymer) are added, along with a plasticizer solution. According to the present invention, a preformed item such as electrical element 50 may simply be adhered to an inner surface of a roto-casting mold with an adhesive. After adding the pellets to the mold, the mold is closed, heated, and spun on at least one axis, and more typically two axes. The heat melts the polymer pellets, thus allowing the plasticizer to be incorporated into the polymer matrix. This process also causes the preformed item to be at least partially surrounded by, and bonded to, the polymer. After a suitable period of time, the heat is removed from the mold, and the mold is cooled, either by air-cooling or by immersion in water, thus fixing electrical element 50 in the molded article. Examples of other suitable molding processes suitable for use in an insert-molding process according to the present invention include blow molding (stretch, extrusion or injection), compression molding, transfer molding (typically used for thermosets, but may also be used in rubber molding), reaction injection (RIM) molding (typically used with urethanes, involves the mixing of two reactive materials in the mold, may also include foam molding), vacuum forming, cold casting, dip molding and slush molding, which is similar to roto-casting but may yield thinner parts.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A doll, comprising:
   a molded portion;
   an interactive feature associated with the molded portion;
   an electronic controller that is at least partially embedded in the molded portion and configured to control the interactive feature; and
   a reinforcement at least partially embedded in the molded portion to reinforce the molded portion against fatigue caused by repeated deformations of the molded portion by the interactive feature.

2. The doll of claim 1, wherein the controller is disposed on a printed circuit board, and the printed circuit board is at least partially embedded in the molded portion.

3. The doll of claim 2, wherein the printed circuit board includes surface mount components.

4. The doll of claim 1, wherein the molded portion includes at least part of a head, and the controller is at least partially embedded in the at least part of a head.

5. The doll of claim 1, wherein the reinforcement insert includes a piece of fabric at least partially embedded in the molded portion.

6. The doll of claim 5, wherein the molded portion includes at least part of a head, and the piece of fabric is at least partially embedded in the at least part of a head adjacent an eye region of the at least part of a head to reinforce the eye region.

7. The doll of claim 5, wherein the piece of fabric is stretchable along at least one direction, and the stretchable direction of the piece of fabric is at least substantially oriented along a direction in which the molded portion is deformed by the interactive feature.

8. A doll, comprising:
   a molded outer portion defining at least one of a body and a head;
   an interactive feature that is associated with the molded outer portion and that includes movement of at least one part of the doll, wherein movement of the at least one part deforms at least one region of the molded outer portion;
   an electronic controller that is at least partially embedded in the molded outer portion and configured to control the interactive feature; and
   a reinforcement that is at least partially embedded in the at least one region, the reinforcement being configured to reinforce the at least one region against fatigue caused by repeated deformations of the at least one region by the interactive feature.

9. The doll of claim 8, wherein the reinforcement is at least partially made from fabric.

10. The doll of claim 9, wherein the fabric is a woven fabric.

11. The doll of claim 10, wherein the fabric is formed from a weave selected from the group consisting of single knit, interlock, percale, organza, and tricot.

12. The doll of claim 10, wherein the molded outer portion is formed from a moldable material, and the fabric is at least partially impregnated by the moldable material.

13. The doll of claim 9, wherein the fabric is formed from a staple fiber.

14. The doll of claim 9, wherein the at least one region is deformed along a direction of deformation by the interactive feature, and the fabric has a direction of stretch oriented along the direction of deformation.

15. The doll of claim 9, wherein the outer molded portion includes a head and the at least one region includes an eye portion of the head, and wherein the fabric is at least partially embedded in the eye portion.

16. A head of a doll, comprising:
   a molded portion;
   at least one connector partially embedded in the molded portion;
   an interactive feature that is associated with the molded portion and that includes movement of at least one part of the head via a motor, wherein the at least one connector connects the molded portion to the motor such that movement of the at least one part deforms at least one region of the molded portion that is adjacent the at least one connector;
   an electronic controller that is at least partially embedded in the molded portion in the head and configured to control the interactive feature; and
   a reinforcement that is at least partially embedded in the at least one region, the reinforcement being adjacent the at least one connector and configured to reinforce the at least one region against fatigue caused by repeated deformation of the at least one region by the interactive feature.

17. The head of claim 16, wherein the at least one region is deformed along a direction of deformation by the interactive feature, and the reinforcement insert has a direction of stretch oriented along the direction of deformation.

18. The doll of claim 16, further comprising at least one eye movably mounted on the head, and wherein the interactive feature includes movement of the at least one eye.

* * * * *